(12) United States Patent
Fu et al.

(10) Patent No.: US 11,121,912 B2
(45) Date of Patent: Sep. 14, 2021

(54) METHOD AND APPARATUS FOR PROCESSING INFORMATION

(71) Applicant: Baidu Online Network Technology (Beijing) Co., Ltd., Beijing (CN)

(72) Inventors: Xiangyu Fu, Beijing (CN); Jie Huang, Beijing (CN); Renlan Cai, Beijing (CN); Shiyu Song, Beijing (CN); Fangfang Dong, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 63 days.

(21) Appl. No.: 16/509,353

(22) Filed: Jul. 11, 2019

(65) Prior Publication Data

US 2020/0028733 A1  Jan. 23, 2020

(30) Foreign Application Priority Data

Jul. 19, 2018 (CN) .......................... 201810795993.4

(51) Int. Cl.
  *H04L 12/06* (2006.01)
  *H04L 12/24* (2006.01)
  *H04L 12/26* (2006.01)

(52) U.S. Cl.
  CPC ...... *H04L 41/0668* (2013.01); *H04L 43/0823* (2013.01)

(58) Field of Classification Search
  CPC .................. H04L 41/0668; H04L 43/0823
  See application file for complete search history.

(56) References Cited

U.S. PATENT DOCUMENTS

| 2008/0104391 | A1* | 5/2008 | Fukuta | H04L 63/0272 713/153 |
| 2013/0184083 | A1* | 7/2013 | Li | A63F 13/35 463/42 |
| 2017/0017560 | A1 | 1/2017 | Takahashi | |
| 2017/0116059 | A1 | 4/2017 | Wolf | |
| 2019/0012858 | A1* | 1/2019 | Troesch | G07C 9/00896 |
| 2019/0123986 | A1* | 4/2019 | Igarashi | G05B 19/4185 |
| 2019/0261223 | A1* | 8/2019 | Miyamoto | H04L 7/0037 |

FOREIGN PATENT DOCUMENTS

| CN | 103778044 | 5/2014 |
| CN | 105225466 | 1/2016 |
| CN | 106446181 | 2/2017 |

* cited by examiner

*Primary Examiner* — Minh Trang T Nguyen
(74) *Attorney, Agent, or Firm* — Knobbe, Martens, Olson & Bear LLP (57) ABSTRACT

A method and an apparatus for processing information are provided. A method may include: sending a preset data acquisition request to a target data transmission end included in at least two preset data transmission ends; receiving feedback information from the target data transmission end, and determining whether the feedback information includes the acquired data; determining, in response to determining that the feedback information does not include the acquired data, whether the feedback information includes first fault information for indicating that the target data transmission end malfunctions; and selecting, in response to determining that the feedback information includes the first fault information, a data transmission end other than the target data transmission end from the at least two data transmission ends as a new target data transmission end.

12 Claims, 5 Drawing Sheets

METHOD AND APPARATUS FOR PROCESSING INFORMATION

CROSS-REFERENCE TO RELATED APPLICATIONS

This application claims priority to Chinese Patent Application No. 201810795993.4, filed on Jul. 19, 2018, titled "Method and Apparatus for Processing Information," which is hereby incorporated by reference in its entirety.

TECHNICAL FIELD

Embodiments of the present disclosure relate to the field of computer technology, specifically to a method and apparatus for processing information.

BACKGROUND

Data transmission is the process of transferring data between a data source and a data sink through one or more links in accordance with appropriate procedures.

At present, data acquired by a data source is usually transmitted to a data sink through a preset data transmission end, and when the data transmission end malfunctions and cannot transmit the data, generally, the data transmission end is repaired or replaced manually.

SUMMARY

Embodiments of the present disclosure provide a method and apparatus for processing information.

In a first aspect, embodiments of the present disclosure provide a method for processing information, including: sending a preset data acquisition request to a target data transmission end, where the target data transmission end is included in at least two preset data transmission ends, and the target data transmission end is communicatively connected with a target data acquisition end, and is configured for sending the preset data acquisition request to the target data acquisition end, and receiving acquired data for the preset data acquisition request sent by the target data acquisition end; receiving feedback information for the preset data acquisition request from the target data transmission end, and determining whether the feedback information includes the acquired data; determining, in response to determining that the feedback information does not include the acquired data, whether the feedback information includes first fault information for indicating that the target data transmission end malfunctions; and selecting, in response to determining that the feedback information includes the first fault information, a data transmission end other than the target data transmission end from the at least two data transmission ends as a new target data transmission end.

In some embodiments, the target data acquisition end is included in at least two preset data acquisition ends; and after the determining, in response to determining that the feedback information does not include the acquired data, whether the feedback information includes first fault information for indicating that the target data transmission end malfunctions, the method further includes: determining, in response to determining that the feedback information does not include the first fault information, whether second fault information for indicating that the target data acquisition end malfunctions is received; and selecting, in response to receiving the second fault information, a data acquisition end other than the target data acquisition end from the at least two data acquisition ends as a new target data acquisition end.

In some embodiments, the determining whether second fault information for indicating that the target data acquisition end malfunctions is received, includes: determining whether the feedback information includes the second fault information for indicating that the target data acquisition end malfunctions.

In some embodiments, the determining, in response to determining that the feedback information does not include the acquired data, whether the feedback information includes first fault information for indicating that the target data transmission end malfunctions, includes: outputting, in response to determining that the feedback information does not include the acquired data, preset alarm information, and determining whether the feedback information includes the first fault information for indicating that the target data transmission end malfunctions.

In some embodiments, after the determining whether the feedback information includes the acquired data, the method further includes: determining, in response to determining that the feedback information includes the acquired data, the target data transmission end as an actual data transmission end.

In a second aspect, embodiments of the present disclosure provide an apparatus for processing information, including: a request sending unit, configured to send a preset data acquisition request to a target data transmission end, where the target data transmission end is included in at least two preset data transmission ends, and the target data transmission end is communicatively connected with a target data acquisition end, and is configured for sending the preset data acquisition request to the target data acquisition end, and receiving acquired data for the preset data acquisition request sent by the target data acquisition end; an information receiving unit, configured to receive feedback information for the preset data acquisition request from the target data transmission end, and determine whether the feedback information includes the acquired data; a first determination unit, configured to determine, in response to determining that the feedback information does not include the acquired data, whether the feedback information includes first fault information for indicating that the target data transmission end malfunctions; and a first selection unit, configured to select, in response to determining that the feedback information includes the first fault information, a data transmission end other than the target data transmission end from the at least two data transmission ends as a new target data transmission end.

In some embodiments, the target data acquisition end is included in at least two preset data acquisition ends; and the apparatus further includes: a second determination unit, configured to determine, in response to determining that the feedback information does not include the first fault information, whether second fault information for indicating that the target data acquisition end malfunctions is received; and a second selection unit, configured to select, in response to receiving the second fault information, a data acquisition end other than the target data acquisition end from the at least two data acquisition ends as a new target data acquisition end.

In some embodiments, the second determination unit is further configured to: determine whether the feedback information includes the second fault information for indicating that the target data acquisition end malfunctions.

In some embodiments, the first determination unit is further configured to: output, in response to determining that the feedback information does not include the acquired data, preset alarm information, and determine whether the feedback information includes the first fault information for indicating that the target data transmission end malfunctions.

In some embodiments, the apparatus further includes: a third determination unit, configured to determine, in response to determining that the feedback information includes the acquired data, the target data transmission end as an actual data transmission end.

In a third aspect, embodiments of the present disclosure provide a server, including: one or more processors; and a storage apparatus, storing one or more programs thereon, the one or more programs, when executed by the one or more processors, cause the one or more processors to implement the method for processing information according to any one of the embodiments.

In a fourth aspect, embodiments of the present disclosure provide a computer readable medium, storing a computer program thereon, the program, when executed by a processor, implements the method for processing information according to any one of the embodiments.

According to the method and apparatus for processing information provided by embodiments of the present disclosure, a preset data acquisition request is sent to a target data transmission end, where the target data transmission end is included in at least two preset data transmission ends, and the target data transmission end is communicatively connected with a target data acquisition end, and is configured for sending the preset data acquisition request to the target data acquisition end, and receiving acquired data for the preset data acquisition request sent by the target data acquisition end, then feedback information for the preset data acquisition request is received from the target data transmission end, and whether the feedback information includes the acquired data is determined, in response to determining that the feedback information does not include the acquired data, whether the feedback information includes first fault information for indicating that the target data transmission end malfunctions is further determined, and in response to determining that the feedback information includes the first fault information, a data transmission end other than the target data transmission end from the at least two data transmission ends is selected as a new target data transmission end. Therefore, by identifying the feedback information corresponding to the preset data acquisition request, the fault condition of the target data transmission end is effectively detected, and when the target data transmission end is detected to be faulty, a backup data transmission end may be automatically selected as the new target data transmission end, thereby improving the flexibility of information processing.

BRIEF DESCRIPTION OF THE DRAWINGS

After reading detailed descriptions of non-limiting embodiments with reference to the following accompanying drawings, other features, objectives and advantages of the present disclosure will become more apparent.

DETAILED DESCRIPTION OF EMBODIMENTS

Embodiments of the present disclosure will be further described below in detail in combination with the accompanying drawings. It may be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should be noted that the embodiments in the present disclosure and the features in the embodiments may be combined with each other on a non-conflict basis. Features of the disclosure will be described below in detail with reference to the accompanying drawings and in combination with embodiments of the present disclosure.

Figure 1:
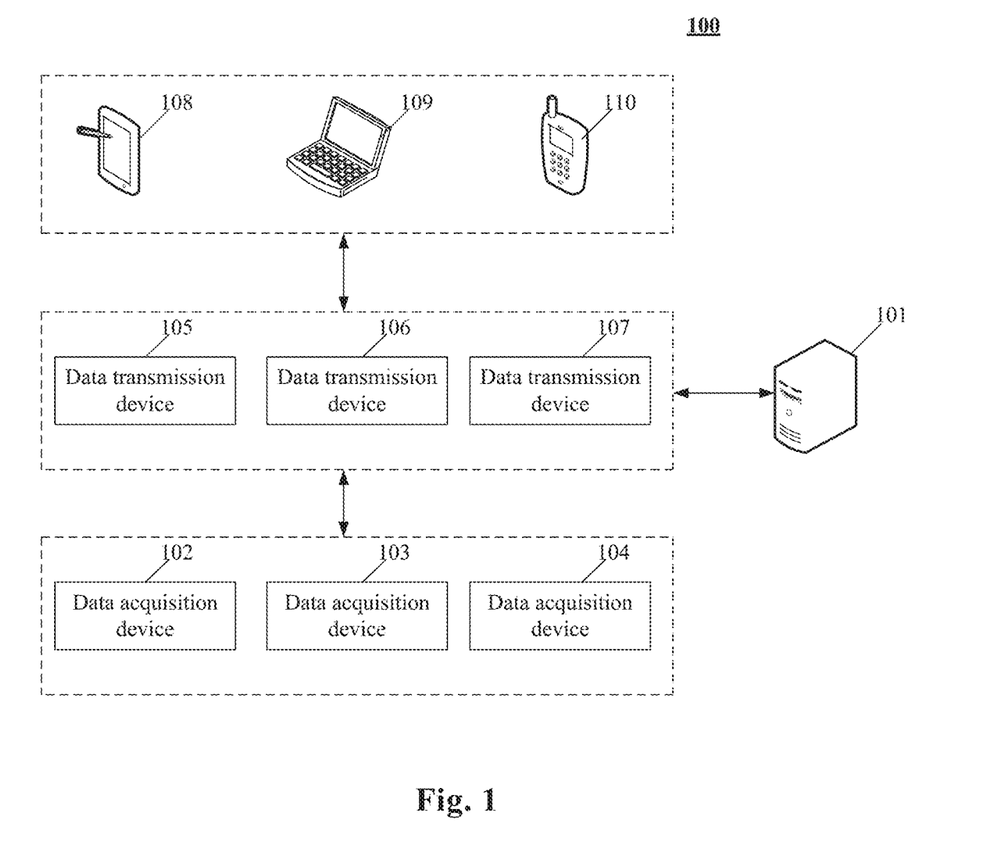
FIG. 1 is an example system architecture diagram to which an embodiment may be applied.

FIG. 1 illustrates an example system architecture 100 to which an embodiment of a method for processing information or an apparatus for processing information may be applied.

As shown in FIG. 1, the system architecture 100 may include a server 101, data acquisition devices 102, 103, 104, data transmission devices 105, 106, 107, and terminal devices 108, 109, 110. The data acquisition devices 102, 103, 104 may be used to acquire data and send the acquired data to the data transmission devices 105, 106, 107. The data transmission devices 105, 106, 107 may be used to transmit the data sent by the data acquisition devices to the terminal devices 108, 109, 110. The server 101 may be communicatively connected with the data transmission devices 105, 106, 107 for testing or monitoring the data transmission devices 105, 106, 107.

It should be noted that, in the data transmission process, one of the data acquisition devices 102, 103, 104 is communicatively connected with one of the data transmission devices 105, 106, 107. In this case, the data transmission device that is in communication connection with the data acquisition device is a target data transmission device to be tested or to be monitored by the server 101.

A user may receive messages sent from the data acquisition devices 102, 103, 104 via the data transmission devices 105, 106, 107 using the terminal devices 108, 109, 110. Various communication client applications, such as a map application, a search application, an instant messaging tool, social platform software, may be installed on the terminal devices 108, 109, and 110.

The data acquisition devices 102, 103, 104 may be hardware or software. When being hardware, the data acquisition devices 102, 103, 104 may be various electronic devices having data acquisition functions, such as base station transceivers. When being software, the data acquisition devices 102, 103, 104 may be installed in the above-listed electronic devices. The data acquisition devices 102, 103, 104 may be implemented as a plurality of software or software modules (e.g., a plurality of software or software modules for providing distributed services), or as a single software or software module, which is not specifically limited here.

The data transmission devices 105, 106, 107 may be hardware or software. When being hardware, the data transmission devices 105, 106, 107 may be various electronic devices having data transmission function. When being software, the data transmission devices 105, 106, 107 are hardware may be installed in the above-listed electronic devices. The data transmission devices 105, 106, 107 are hardware may be implemented as a plurality of software or software modules (e.g., a plurality of software or software modules for providing distributed services), or as a single software or software module, which is not specifically limited here.

The terminal devices 108, 109, 110 may be hardware or software. When being hardware, the terminal devices 108, 109, 110 may be various electronic devices having display screens, including but not limited to smart phones, tablets, laptop portable computers, desktop computers, etc. When being software, the terminal devices 108, 109, 110 may be installed in the above-listed electronic devices. The terminal devices 108, 109, 110 are hardware may be implemented as a plurality of software or software modules (e.g., a plurality of software or software modules for providing distributed services), or as a single software or software module, which is not specifically limited here.

The server 101 may be a server for testing or monitoring the target data transmission device. The server 101 may send a preset data acquisition request to the target data transmission device, acquire feedback information for the preset data acquisition request sent by the target data transmission device, and perform a corresponding operation based on the feedback information (for example, selecting a new target data transmission device).

It should be noted that the method for processing information provided by some embodiments of the present disclosure is generally executed by the server 101. Accordingly, the apparatus for processing information is generally provided in the server 101.

It should be noted that the server 101 may be hardware or software. When being hardware, the server 101 may be implemented as a distributed server cluster composed of multiple servers, or as a single server. When being software, the server 101 may be implemented as a plurality of software or software modules (e.g., a plurality of software or software modules for providing distributed services), or as a single software or software module, which is not specifically limited here.

It should be noted that the numbers of the terminal devices, the data acquisition devices and the servers in FIG. 1 are merely illustrative. Any number of terminal devices, data acquisition devices and servers may be provided based on the implementation requirements. However, the number of data transmission devices in FIG. 1 is equal or greater than 2.

Figure 2:
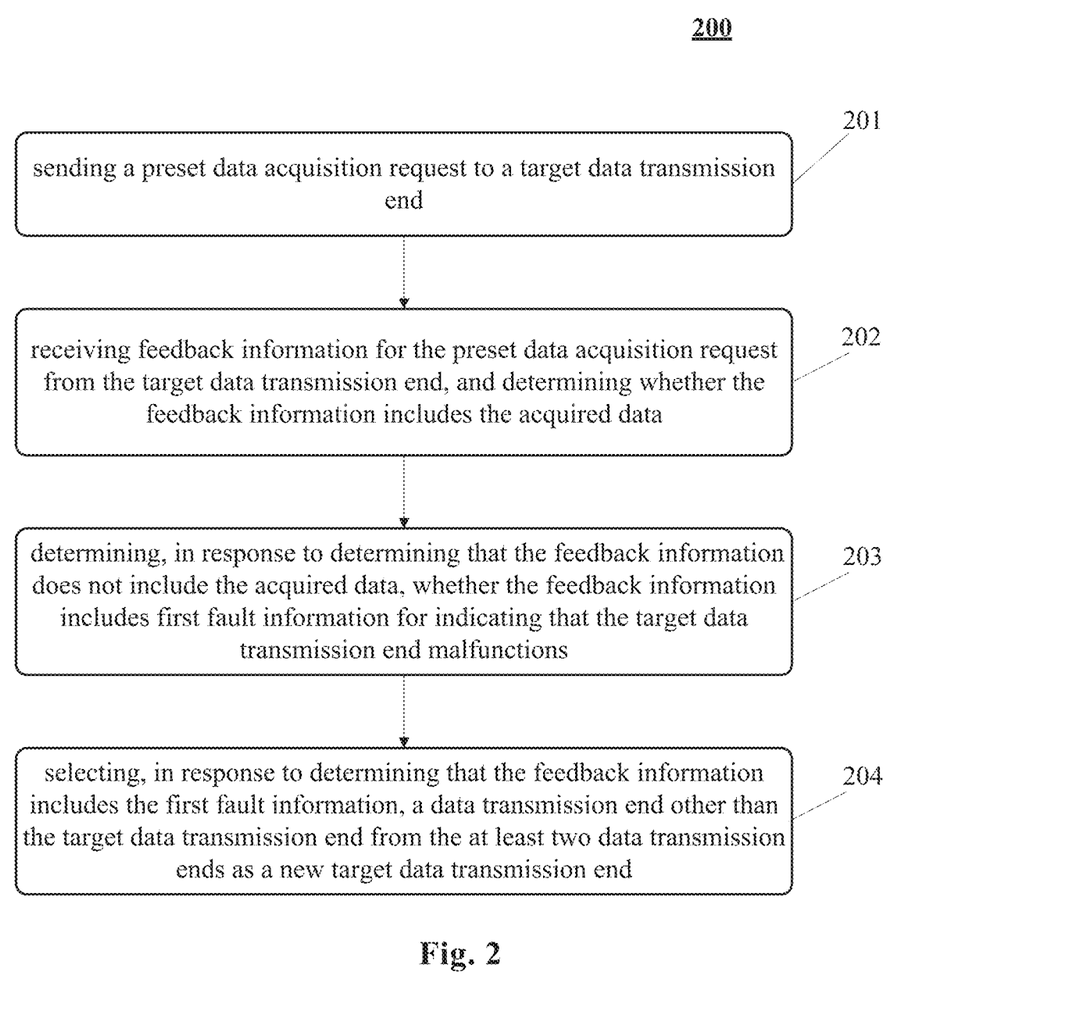
FIG. 2 is a flowchart of an embodiment of a method for processing information.

With further reference to FIG. 2, a flow 200 of an embodiment of a method for processing information is illustrated. The method for processing information includes the following steps 201 to 204.

Step 201 includes sending a preset data acquisition request to a target data transmission end.

In the present embodiment, an executing body (for example, the server shown in FIG. 1) of the method for processing information may send the preset data acquisition request to the target data transmission end through a wired connection or a wireless connection. The target data transmission end may include at least two preset data transmission ends (for example, the data transmission devices shown in FIG. 1), and the target data transmission end is communicatively connected with a target data acquisition end (for example, the data acquisition devices shown in FIG. 1), and is configured for sending the preset data acquisition request to the target data acquisition end, and receiving acquired data for the preset data acquisition request sent by the target data acquisition end. It should be noted that each of the at least two data transmission ends may have a same configuration.

Here, the target data acquisition end may be a data acquisition end to be used to acquire data. The target data transmission end may be a data transmission end that is communicatively connected with the target data acquisition end and to be used to transmit data. The preset data acquisition request may be an acquisition request of various data (for example, geographic location data, light intensity data, and the like) for detecting a fault, preset by those skilled in the art.

It may be understood that, in order to detect a fault, those skilled in the art may predetermine the corresponding relationship between the preset data acquisition request and the acquired data by using the executing body, and further, after the preset data acquisition request is sent to the target data transmission end, when receiving the acquired data corresponding to the preset data acquisition request, the executing body may determine that both the target data transmission end and the target data acquisition end are in a non-faulty state.

Step 202 includes receiving feedback information for the preset data acquisition request from the target data transmission end, and determining whether the feedback information includes the acquired data.

In the present embodiment, after performing step 201, the executing body may receive feedback information for the preset data acquisition request from the target data transmission end, and determine whether the feedback information includes the acquired data. The feedback information may be information used to response to the preset data acquisition request. The feedback information may include, but is not limited to, at least one of the following: a text, a number, a symbol, and a picture.

It should be noted that, when the target data transmission end is in a non-faulty state (assuming that the target data acquisition end is in the non-faulty state), after receiving the preset data acquisition request, the target data transmission end sends the preset data acquisition request to the target data acquisition end that is in communication connection therewith, receives the acquired data for the preset data acquisition request acquired by the target data acquisition end, and then sends the received acquired data as the feedback information to the executing body. Therefore, if the executing body may determine that the feedback information includes the acquired data, it may be determined that the target data transmission end is in a non-faulty state.

Specifically, the executing body may use the corresponding relationship between the preset data acquisition request and the acquired data to identify the feedback information (for example, performing a similarity calculation on the feedback information and the acquired data in the corresponding relationship) to determine whether the feedback information includes the acquired data.

In addition, it should be noted that, when the target data transmission end is in the faulty state, after receiving the preset data acquisition request, the target data transmission end may not be able to send the preset data acquisition request to the target data acquisition end that is in communication connection therewith. In this case, the target data transmission end may generate information for indicating that the target data transmission is in the faulty state, and transmit the generated information for indicating its faulty state as the feedback information to the executing body.

Step 203 includes determining, in response to determining that the feedback information does not include the acquired data, whether the feedback information includes first fault information for indicating that the target data transmission end malfunctions.

In the present embodiment, the executing body may determine, in response to determining that the feedback information does not include the acquired data, whether the feedback information includes first fault information for indicating that the target data transmission end malfunctions. Here, the first fault information is the above information for indicating that the target data transmission end is in the faulty state. The first fault information may be information predetermined by those skilled in the art. Specifically, the first fault information may include, but is not limited to, at least one of the following: a text, a number, a symbol, a picture, and an audio.

It may be understood that multiple situations may cause that the feedback information does not include the acquired data (that is, the executing body cannot acquire the acquired data), for example, the target data transmission end malfunctions, or the target data acquisition end malfunctions. Therefore, when the feedback information does not include the acquired data, the executing body may determine whether the target data transmission end malfunctions by determining whether the feedback information includes the first fault information for indicating that the target data transmission end malfunctions.

Specifically, those skilled in the art may record the predetermined first fault information into the executing body, and further, the executing body may identify the feedback information based on the recorded first fault information (for example, performing a similarity calculation on the feedback information and the first fault information) to determine whether the feedback information includes the first fault information.

In some alternative implementations of the present embodiment, in response to determining that the feedback information does not include the acquired data, the executing body may alternatively output preset alarm information. The alarm information may include, but is not limited to, at least one of the following: a text, a number, a symbol, a picture, and an audio. For example, the alarm information may be the symbol "!!!".

In some alternative implementations of the present embodiment, after determining whether the feedback information includes the acquired data, the executing body may also determine, in response to determining that the feedback information includes the acquired data, the target data transmission end as an actual data transmission end. The actual data transmission end is a data transmission end (the actually used data transmission end) in communication connection with a terminal (for example, the terminal devices shown in FIG. 1) used by the user.

Step 204 includes selecting, in response to determining that the feedback information includes the first fault information, a data transmission end other than the target data transmission end from the at least two data transmission ends as a new target data transmission end.

In the present embodiment, the executing body may select, in response to determining that the feedback information includes the first fault information for indicating that the target data transmission end malfunctions, the data transmission end other than the target data transmission end from the at least two data transmission ends as the new target data transmission end.

Here, the executing body may select, from the at least two data transmission ends, the data transmission end other than the target data transmission end as the new target data transmission end by using various methods, for example, may adopt a random selection method, or may select an untested data transmission end from the at least two data transmission ends as the new target data transmission end.

Here, it should be noted that, for a tested data transmission end (i.e., a data transmission end has been used as the target data transmission end to receive the preset data acquisition request), the executing body may generate, for the data transmission end, information for indicating that the data transmission end has been tested (such as an identifier predetermined by those skilled in the art). Further, for any one of the at least two data transmission ends other than the target data transmission end, the executing body may determine whether the data transmission end has been tested by determining whether the information being used to indicate that the data transmission end is tested and corresponding to the data transmission end, is stored locally, and then select an untested data transmission end from the at least two data transmission ends as the new target data transmission end.

In practice, the at least two data transmission ends may provide a transmission interface externally through a preset network protocol, and at any time, the network protocol may have a binding relationship with one of the at least two data transmission ends. It may be understood that, here, the data transmission end having the binding relationship with the network protocol is the data transmission end communicatively connected with the target data acquisition end, that is, the target data transmission end. Therefore, the executing body may cut the binding relationship between the target data transmission end and the network protocol, and establish a binding relationship between a data transmission end other than the target data transmission end in the at least two data transmission ends and the network protocol, thus implementing the above step of selecting a new target data transmission end.

Figure 3:
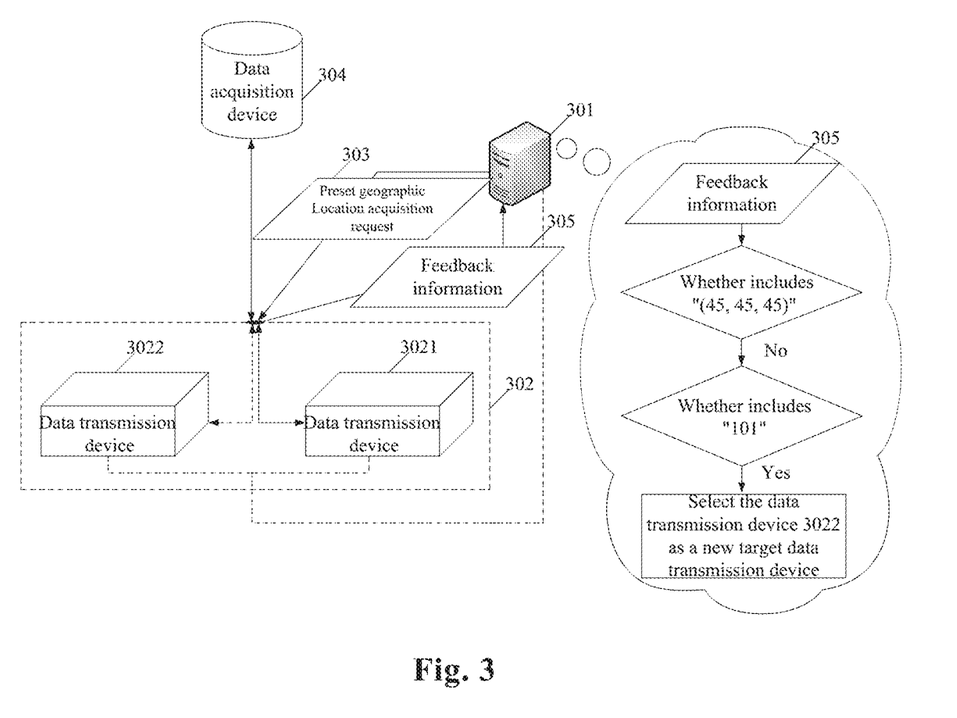
FIG. 3 is a schematic diagram of an application scenario of the method for processing information according to an embodiment.

With further reference to FIG. 3, FIG. 3 is a schematic diagram of an application scenario of the method for processing information according to the present embodiment. In the application scenario of FIG. 3, first, a server 301 sends a preset data acquisition request (preset geographic location acquisition request) 303 to a target data transmission device 3021 in the preset two data transmission devices 3021, 3022, where the target data transmission device 3021 is communicatively connected with a target data acquisition device 304, and is configured for sending the preset data acquisition request 303 to the target data acquisition device 304, and receiving acquired data "(45, 45, 45)" for the preset data acquisition request 303 sent by the target data acquisition device 304, where "(45, 45, 45)" is the coordinates of the preset geographic location. Then, the server 301 may receive feedback information 305 for the preset data acquisition request 303 from the target data transmission device 3021, and determine whether the feedback information 305 includes the acquired data. Next, the server 301 may determine whether the feedback information 305 includes first fault information "101" for indicating that the target data transmission device 3021 malfunctions, in response to determining that the feedback information 305 does not include the acquired data. Finally, the server 301 may perform a switching operation of the data transmission device, in response to determining that the feedback information 305 includes the first fault information, and select the data transmission device 3022 as the new target data transmission device.

According to a method provided by some embodiments of the present disclosure, a preset data acquisition request is sent to a target data transmission end, where the target data transmission end is included in at least two preset data transmission ends, and the target data transmission end is communicatively connected with a target data acquisition end, and is configured for sending the preset data acquisition request to the target data acquisition end, and receiving acquired data for the preset data acquisition request sent by the target data acquisition end, then feedback information for the preset data acquisition request is received from the target data transmission end, and whether the feedback information includes the acquired data is determined, in response to determining that the feedback information does not include the acquired data, whether the feedback information includes first fault information for indicating that the target data transmission end malfunctions is further determined, and in response to determining that the feedback information includes the first fault information, a data transmission end other than the target data transmission end from the at least two data transmission ends is selected as a new target data transmission end. Therefore, by identifying the feedback information corresponding to the preset data acquisition request, the fault condition of the target data transmission end is effectively detected, and when the target data transmission end is detected to be faulty, a backup data transmission end may be automatically selected as the new target data transmission end, thereby improving the flexibility of information processing.

Figure 4:
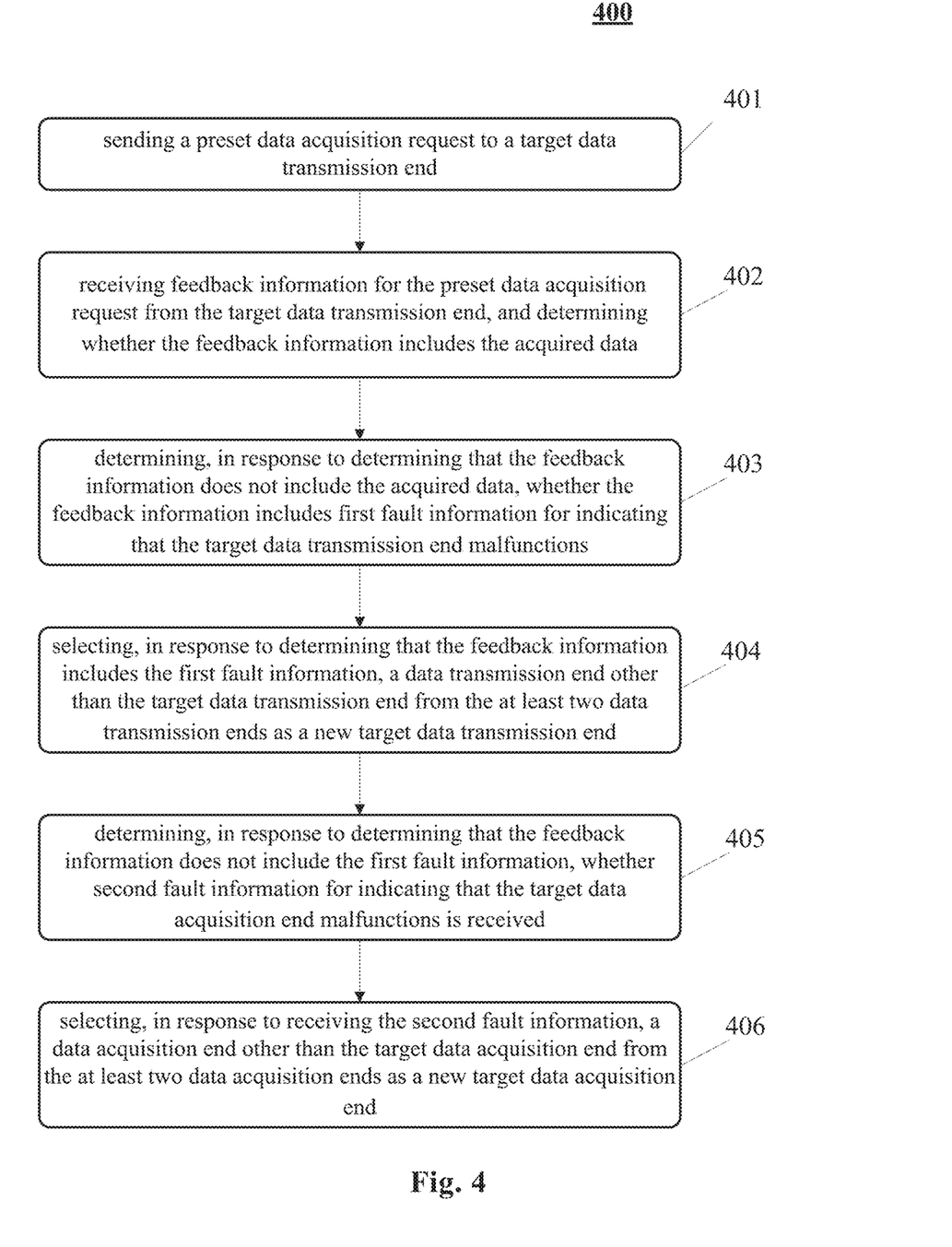
FIG. 4 is a flowchart of yet another embodiment of the method for processing information.

With further reference to FIG. 4, a flow 400 of another embodiment of the method for processing information is illustrated. The flow 400 of the method for processing information includes the following steps 401 to 406.

Step 401 includes sending a preset data acquisition request to a target data transmission end.

In the present embodiment, an executing body (for example, the server shown in FIG. 1) of the method for processing information may send the preset data acquisition request to the target data transmission end through a wired connection or a wireless connection. The target data transmission end may be included in at least two preset data transmission ends (for example, the data transmission devices shown in FIG. 1), and the target data transmission end is communicatively connected with a target data acquisition end (for example, the data acquisition devices shown in FIG. 1), and is configured for sending the preset data acquisition request to the target data acquisition end, and receiving acquired data for the preset data acquisition request sent by the target data acquisition end. The target data acquisition end may be included at least two preset data acquisition ends. The target data acquisition end may be in communication connection with the executing body.

It should be noted that the configuration of each of the at least two data transmission ends may be the same. The configuration of each of the at least two data acquisition ends may also be the same.

Here, the target data acquisition end may be a data acquisition end to be used to acquire data. The target data transmission end may be a data transmission end that is communicatively connected with the target data acquisition end and to be used to transmit data. The preset data acquisition request may be an acquisition request of various data (for example, geographic location data, light intensity data, and the like) for detecting a fault, preset by those skilled in the art.

Step 402 includes receiving feedback information for the preset data acquisition request from the target data transmission end, and determining whether the feedback information includes the acquired data.

In the present embodiment, after performing step 401, the executing body may receive feedback information for the preset data acquisition request from the target data transmission end, and determine whether the feedback information includes the acquired data. The feedback information may be information for responding to the preset data acquisition request. The feedback information may include, but is not limited to, at least one of the following: a text, a number, a symbol, and a picture.

Step 403 includes determining, in response to determining that the feedback information does not include the acquired data, whether the feedback information includes first fault information for indicating that the target data transmission end malfunctions.

In the present embodiment, the executing body may determine, in response to determining that the feedback information does not include the acquired data, whether the feedback information includes first fault information for indicating that the target data transmission end malfunctions. Here, the first fault information is the information for indicating that the target data transmission end is in a faulty state. The first fault information may be information predetermined by those skilled in the art. Specifically, the first fault information may include, but is not limited to, at least one of the following: a text, a number, a symbol, a picture, and an audio.

Step 404 includes selecting, in response to determining that the feedback information includes the first fault information, a data transmission end other than the target data transmission end from the at least two data transmission ends as a new target data transmission end.

In the present embodiment, the executing body may select, in response to determining that the feedback information includes the first fault information for indicating that the target data transmission end malfunctions, the data transmission end other than the target data transmission end from the at least two data transmission ends as the new target data transmission end.

In the present embodiment, the above steps 401, 402, 403, 404 may be implemented in a similar way to steps 201, 202, 203, 204 in the foregoing embodiment. Accordingly, the above description for steps 201, 202, 203, 204 is also applicable to steps 401, 402, 403, 404 of the present embodiment, and detailed description thereof will be omitted.

Step 405 includes determining, in response to determining that the feedback information does not include the first fault information, whether second fault information for indicating that the target data acquisition end malfunctions is received.

In the present embodiment, the executing body may alternatively determine, in response to determining that the feedback information does not include the first fault information, whether second fault information for indicating that the target data acquisition end malfunctions is received. Here, the second fault information may be information predetermined by those skilled in the art. Specifically, the second fault information may include, but is not limited to, at least one of the following: a text, a number, a symbol, a picture, and an audio.

It may be understood that only when the target data transmission end is in a non-faulty state (i.e., the feedback information does not include the first fault information), the target data transmission end may send the preset data acquisition request to the target data acquisition end, and only when receiving the preset data acquisition request, the target data acquisition end may inspect the fault condition of the target data transmission end.

In practice, after the target data acquisition end receives the preset data acquisition request, if the target data acquisition end is in a non-faulty state, the target data acquisition end may acquire the acquired data corresponding to the preset data acquisition request, and send the acquired data to the target data transmission end, and the target data transmission end may send the acquired data as feedback information to the executing body; if the target data acquisition end is in a faulty state, the target data acquisition end may generate the second fault information for indicating that the target data acquisition end is in a fault state and send the second fault information to the executing body.

It should be noted that, here, the target data acquisition end may directly send the generated second fault information to the executing body, or the target data acquisition end may send the generated second fault information to the target data transmission end. Further, the target data transmission end may send the second fault information as the feedback information to the executing body. Therefore, in some alternative implementations of the present embodiment, the executing body may determine whether the second fault information for indicating that the target data acquisition end malfunctions is received, by determining whether the feedback information includes the second fault information for indicating that the target data acquisition end malfunctions.

Specifically, those skilled in the art may record the predetermined second fault information into the executing body, and further, the executing body may determine whether the second fault information for indicating that the target data acquisition end malfunctions is received, based on the recorded second fault information.

Step 406 includes selecting, in response to receiving the second fault information, a data acquisition end other than the target data acquisition end from the at least two data acquisition ends as a new target data acquisition end.

In the present embodiment, the executing body may select, in response to receiving the second fault information, the data acquisition end other than the target data acquisition end from the at least two data acquisition ends as the new target data acquisition end.

Here, the executing body may select, from the at least two data acquisition ends, the data acquisition end other than the target data acquisition end as the new target data acquisition end by using various methods, for example, may adopt a random selection method, or may select an untested data acquisition end from the at least two data acquisition ends as the new target data acquisition end.

Here, it should be noted that, for a data acquisition end being tested (that is, being used as the target data acquisition end to receive the preset data acquisition request), the executing body may generate, for the data acquisition end, information for indicating that the data acquisition end has been tested (such as an identifier predetermined by those skilled in the art). Further, for any one of the at least two data acquisition ends other than the target data acquisition end, the executing body may determine whether the data acquisition end has been examined by determining whether the information being used to indicate that the data acquisition end is tested and corresponding to the data acquisition end is stored locally, and then select an untested data acquisition end from the at least two data acquisition ends as the new target data acquisition end.

In practice, the at least two data transmission ends may provide a transmission interface externally through a preset network protocol, and at any time, only one of the at least two data acquisition ends is connected to the transmission interface. It may be understood that, here, the data acquisition end connected to the transmission interface is the target data acquisition end. Therefore, the executing body may cut the connection relationship between the target data acquisition end and the transmission interface, and establish a connection relationship between a data acquisition end other than the target data acquisition end in the at least two data acquisition ends and the transmission interface, thus implementing the above step of selecting a new target data acquisition end.

As can be seen from FIG. 4, the flow 400 of the method for processing information in the present embodiment highlights the step of testing the target data acquisition end, as compared to the embodiment corresponding to FIG. 2. Therefore, the solution described in the present embodiment may test both the target data transmission end and the target data acquisition end to determine the fault condition of the target data transmission end and the target data acquisition end, and then perform a corresponding operation according to the fault condition (selecting a new target data transmission end and/or selecting a new target data acquisition end), which further improves the flexibility of information processing and improves the comprehensiveness of information processing.

Figure 5:
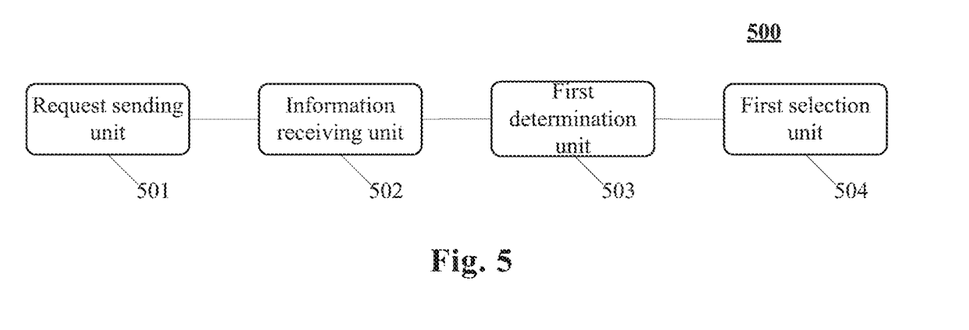
FIG. 5 is a schematic structural diagram of an embodiment of an apparatus for processing information.

With further reference to FIG. 5, as an implementation of the method shown in the above figures, the present disclosure provides an embodiment of an apparatus for processing information, and the apparatus embodiment corresponds to the method embodiment as shown in FIG. 2, and the apparatus may be specifically applied to various electronic devices.

As shown in FIG. 5, the apparatus 500 for processing information of the present embodiment includes: a request sending unit 501, an information receiving unit 502, a first determination unit 503 and a first selection unit 504. The request sending unit 501 is configured to send a preset data acquisition request to a target data transmission end, where the target data transmission end is included in at least two preset data transmission ends, and the target data transmission end is communicatively connected with a target data acquisition end, and configured for sending the preset data acquisition request to the target data acquisition end, and receiving acquired data for the preset data acquisition request sent by the target data acquisition end. The information receiving unit 502 is configured to receive feedback information for the preset data acquisition request from the target data transmission end, and determine whether the feedback information includes the acquired data. The first determination unit 503 is configured to determine, in response to determining that the feedback information does not include the acquired data, whether the feedback information includes first fault information for indicating that the target data transmission end malfunctions. The first selection unit 504 is configured to select, in response to determining that the feedback information includes the first fault information, a data transmission end other than the target data transmission end from the at least two data transmission ends as a new target data transmission end.

In the present embodiment, the request sending unit 501 of the apparatus for processing information may send a preset data acquisition request to a target data transmission end through a wired connection or a wireless connection. The target data transmission end may be included in at least two preset data transmission ends (for example, the data transmission devices shown in FIG. 1), and the target data transmission end is communicatively connected with a target data acquisition end (for example, the data acquisition devices shown in FIG. 1), and is configured for sending the preset data acquisition request to the target data acquisition end, and receiving acquired data for the preset data acquisition request sent by the target data acquisition end. It should be noted that the configuration of each of the at least two data transmission ends may be the same.

In the present embodiment, after the request sending unit 501 sends the preset data acquisition request, the information receiving unit 502 may receive feedback information for the preset data acquisition request from the target data transmission end, and determine whether the feedback information includes the acquired data. The feedback information may be information for responding to the preset data acquisition request. The feedback information may include, but is not limited to, at least one of the following: a text, a number, a symbol, and a picture.

In the present embodiment, the first determination unit 503 may determine, in response to determining that the feedback information does not include the acquired data, whether the feedback information includes first fault information for indicating that the target data transmission end malfunctions. Here, the first fault information is the information for indicating that the target data transmission end is in a faulty state. The first fault information may be information predetermined by those skilled in the art. Specifically, the first fault information may include, but is not limited to, at least one of the following: a text, a number, a symbol, a picture, and an audio.

In the present embodiment, the first selection unit 504 may select, in response to determining that the feedback information includes the first fault information for indicating that the target data transmission end malfunctions, a data transmission end other than the target data transmission end from the at least two data transmission ends as a new target data transmission end.

In some alternative implementations of the present embodiment, the target data acquisition end is included in at least two preset data acquisition ends; and the apparatus 500 may further include: a second determination unit (not shown in the figure), configured to determine, in response to determining that the feedback information does not include the first fault information, whether second fault information for indicating that the target data acquisition end malfunctions is received; and a second selection unit (not shown in the figure), configured to select, in response to receiving the second fault information, a data acquisition end other than the target data acquisition end from the at least two data acquisition ends as a new target data acquisition end.

In some alternative implementations of the present embodiment, the second determination unit may be further configured to: determine whether the feedback information includes the second fault information for indicating that the target data acquisition end malfunctions.

In some alternative implementations of the present embodiment, the first determination unit 503 may be further configured to: output, in response to determining that the feedback information does not include the acquired data, preset alarm information, and determine whether the feedback information includes the first fault information for indicating that the target data transmission end malfunctions.

In some alternative implementations of the present embodiment, the apparatus 500 may further include: a third determination unit (not shown in the figure), configured to determine, in response to determining that the feedback information includes the acquired data, the target data transmission end as an actual data transmission end.

It may be understood that the units recited in the apparatus 500 correspond to the various steps in the method described with reference to FIG. 2. Thus, the operations, features, and resulting advantageous effects described above for the method are equally applicable to the apparatus 500 and the units contained therein, and detailed description thereof will be omitted.

In the apparatus 500 provided by some embodiments of the present disclosure, the request sending unit 501 sends a preset data acquisition request to a target data transmission end, where the target data transmission end is included in at least two preset data transmission ends, and the target data transmission end is communicatively connected with a target data acquisition end, and is configured for sending the preset data acquisition request to the target data acquisition end, and receiving acquired data for the preset data acquisition request sent by the target data acquisition end, then the information receiving unit 502 receives feedback information for the preset data acquisition request from the target data transmission end, and determines whether the feedback information includes the acquired data, further, the first determination unit 503 determines, in response to determining that the feedback information does not include the acquired data, whether the feedback information includes first fault information for indicating that the target data transmission end malfunctions, and the first selection unit 504 selects, in response to determining that the feedback information includes the first fault information, a data transmission end other than the target data transmission end from the at least two data transmission ends as a new target data transmission end. Therefore, by identifying the feedback information corresponding to the preset data acquisition request, the fault condition of the target data transmission end is effectively detected, and when the target data transmission end is detected to be faulty, a backup data transmission end may be automatically selected as a new target data transmission end, thereby improving the flexibility of information processing.

Figure 6:
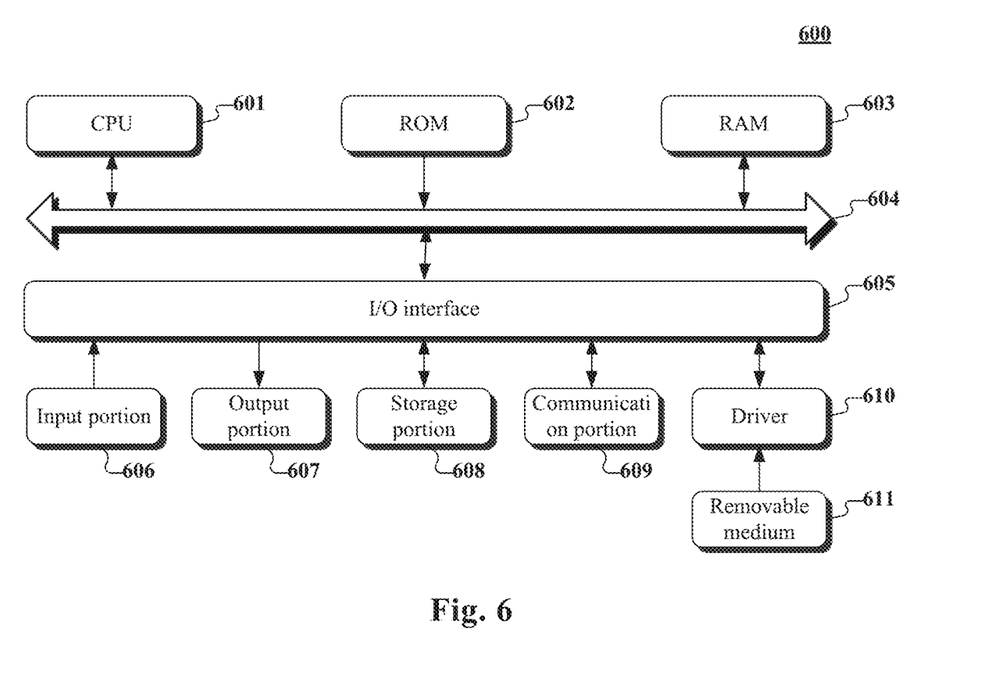
FIG. 6 is a schematic structural diagram of a computer system adapted to implement a server of some embodiments of the present disclosure.

With further reference to FIG. 6, a schematic structural diagram of a computer system 600 adapted to implement a server of some embodiments of the present disclosure is shown. The server shown in FIG. 6 is merely an example, and should not impose any limitation on the function and scope of use of the embodiments of the present disclosure.

With further reference to FIG. 6, a schematic structural diagram of a computer system 600 adapted to implement an electronic device (for example, the server as shown in FIG. 1) of some embodiments of the present disclosure is shown. The electronic device shown in FIG. 6 is merely an example, and should not impose any limitation on the function and scope of use of the embodiments of the present disclosure.

As shown in FIG. 6, the computer system 600 includes a central processing unit (CPU) 601, which may execute various appropriate actions and processes in accordance with a program stored in a read-only memory (ROM) 602 or a program loaded into a random access memory (RAM) 603 from a storage portion 608. The RAM 603 also stores various programs and data required by operations of the system 600. The CPU 601, the ROM 602 and the RAM 603 are connected to each other through a bus 604. An input/output (I/O) interface 605 is also connected to the bus 604.

The following components are connected to the I/O interface 605: an input portion 606 including a keyboard, a mouse, etc.; an output portion 607 including such as a cathode ray tube (CRT), a liquid crystal display device (LCD), a speaker, etc.; a storage portion 608 including a hard disk and the like; and a communication portion 609 including a network interface card, such as a LAN card and a modem. The communication portion 609 performs communication processes via a network, such as the Internet. A driver 610 is also connected to the I/O interface 605 as required. A removable medium 611, such as a magnetic disk, an optical disk, a magneto-optical disk, and a semiconductor memory, may be installed on the driver 610, to facilitate the retrieval of a computer program from the removable medium 611, and the installation thereof on the storage portion 608 as needed.

In particular, according to some embodiments of the present disclosure, the process described above with reference to the flow chart may be implemented in a computer software program. For example, an embodiment of the present disclosure includes a computer program product, which includes a computer program that is tangibly embedded in a computer-readable medium. The computer program includes program codes for performing the method as illustrated in the flow chart. In such an embodiment, the computer program may be downloaded and installed from a network via the communication portion 609, and/or may be installed from the removable medium 611. The computer program, when executed by the central processing unit (CPU) 601, implements the above mentioned functionalities as defined by the method of the present disclosure. It should be noted that the computer readable medium in the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination of any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fiber, a portable compact disk read only memory (CD-ROM), an optical memory, a magnet memory or any suitable combination of the above. In the present disclosure, the computer readable storage medium may be any physical medium containing or storing programs which may be used by a command execution system, apparatus or element or incorporated thereto. In the present disclosure, the computer readable signal medium may include data signal in the base band or propagating as parts of a carrier, in which computer readable program codes are carried. The propagating data signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

The flow charts and block diagrams in the accompanying drawings illustrate architectures, functions and operations that may be implemented according to the systems, methods and computer program products of various embodiments of the present disclosure. In this regard, each of the blocks in the flow charts or block diagrams may represent a module, a program segment, or a code portion, said module, program segment, or code portion including one or more executable instructions for implementing specified logic functions. It should also be noted that, in some alternative implementations, the functions denoted by the blocks may occur in a sequence different from the sequences shown in the accompanying drawings. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system performing specified functions or operations, or by a combination of a dedicated hardware and computer instructions.

The units involved in some embodiments of the present disclosure may be implemented by means of software or hardware. The described units may also be provided in a processor, for example, may be described as: a processor including a request sending unit, an information receiving unit, a first determination unit and a first selection unit. Here, the names of these units do not in some cases constitute limitations to such units themselves. For example, the request sending unit may also be described as "a unit for sending a preset data acquisition request."

In another aspect, the present disclosure further provides a computer readable medium. The computer readable medium may be included in the server in the above described embodiments, or a stand-alone computer readable medium not assembled into the server. The computer readable medium stores one or more programs. The one or more programs, when executed by the server, cause the server to: send a preset data acquisition request to a target data transmission end, where the target data transmission end is included in at least two preset data transmission ends, and the target data transmission end is communicatively connected with a target data acquisition end, and is configured for sending the preset data acquisition request to the target data acquisition end, and receiving acquired data for the preset data acquisition request sent by the target data acquisition end; receive feedback information for the preset data acquisition request from the target data transmission end, and determine whether the feedback information includes the acquired data; determine, in response to determining that the feedback information does not include the acquired data, whether the feedback information includes first fault information for indicating that the target data transmission end malfunctions; and select, in response to determining that the feedback information includes the first fault information, a data transmission end other than the target data transmission end from the at least two data transmission ends as a new target data transmission end.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the present disclosure. Technical schemes formed by the above-described features being interchanged with, but not limited to, technical features with similar functions disclosed in the present disclosure are examples.

What is claimed is:

1. A method for processing information, the method comprising:

sending a preset data acquisition request to a target data transmission end, wherein the target data transmission end is included in at least two preset data transmission ends, and the target data transmission end is communicatively connected with a target data acquisition end, and is configured for sending the preset data acquisition request to the target data acquisition end, and receiving acquired data for the preset data acquisition request sent by the target data acquisition end;

receiving feedback information for the preset data acquisition request from the target data transmission end, and determining whether the feedback information comprises the acquired data;

determining, in response to determining that the feedback information does not comprise the acquired data, whether the feedback information comprises first fault information for indicating that the target data transmission end malfunctions; and selecting, in response to determining that the feedback information comprises the first fault information, a data transmission end other than the target data transmission end from the at least two data transmission ends as a new target data transmission end, wherein the new target data transmission end is communicatively connected with the target data acquisition end and is configured for sending the preset data acquisition request to the target data acquisition end, and receiving the acquired data for the preset data acquisition request sent by the target data acquisition end.

2. The method according to claim 1, wherein the target data acquisition end is included in at least two preset data acquisition ends; and the method further comprises, after the determining, in response to determining that the feedback information does not comprise the acquired data, whether the feedback information comprises first fault information for indicating that the target data transmission end malfunctions:

determining, in response to determining that the feedback information does not comprise the first fault information, whether second fault information for indicating that the target data acquisition end malfunctions is received; and selecting, in response to receiving the second fault information, a data acquisition end other than the target data acquisition end from the at least two data acquisition ends as a new target data acquisition end.

3. The method according to claim 2, wherein the determining whether second fault information for indicating that the target data acquisition end malfunctions is received, comprises:

determining whether the feedback information comprises the second fault information for indicating that the target data acquisition end malfunctions.

4. The method according to claim 1, wherein the determining, in response to determining that the feedback information does not comprise the acquired data, whether the feedback information comprises first fault information for indicating that the target data transmission end malfunctions, comprises:

outputting, in response to determining that the feedback information does not comprise the acquired data, preset alarm information, and determining whether the feedback information comprises the first fault information for indicating that the target data transmission end malfunctions.

5. The method according to claim 1, wherein the method further comprises, after the determining whether the feedback information comprises the acquired data:

determining, in response to determining that the feedback information comprises the acquired data, the target data transmission end as an actual data transmission end.

6. The method according to claim 1, wherein the preset data acquisition request comprises a preset geographic location acquisition request, and the acquired data comprises coordinates of a preset geographic location sent by the target data acquisition device.

7. An apparatus for processing information, the apparatus comprising:

at least one processor; and a memory storing instructions, wherein the instructions when executed by the at least one processor, cause the at least one processor to perform operations, the operations comprising:

sending a preset data acquisition request to a target data transmission end, wherein the target data transmission end is included in at least two preset data transmission ends, and the target data transmission end is communicatively connected with a target data acquisition end, and is configured for sending the preset data acquisition request to the target data acquisition end, and receiving acquired data for the preset data acquisition request sent by the target data acquisition end;

receiving feedback information for the preset data acquisition request from the target data transmission end, and determining whether the feedback information comprises the acquired data;

determining, in response to determining that the feedback information does not comprise the acquired data, whether the feedback information comprises first fault information for indicating that the target data transmission end malfunctions; and selecting, in response to determining that the feedback information comprises the first fault information, a data transmission end other than the target data transmission end from the at least two data transmission ends as a new target data transmission end, wherein the new target data transmission end is communicatively connected with the target data acquisition end and is configured for sending the preset data acquisition request to the target data acquisition end, and receiving the acquired data for the preset data acquisition request sent by the target data acquisition end.

8. The apparatus according to claim 7, wherein the target data acquisition end is included in at least two preset data acquisition ends; and the operations further comprise, after the determining, in response to determining that the feedback information does not comprise the acquired data, whether the feedback information comprises first fault information for indicating that the target data transmission end malfunctions:

determining, in response to determining that the feedback information does not comprise the first fault information, whether second fault information for indicating that the target data acquisition end malfunctions is received; and selecting, in response to receiving the second fault information, a data acquisition end other than the target data acquisition end from the at least two data acquisition ends as a new target data acquisition end.

9. The apparatus according to claim 8, wherein the determining whether second fault information for indicating that the target data acquisition end malfunctions is received, comprises:

determining whether the feedback information comprises the second fault information for indicating that the target data acquisition end malfunctions.

10. The apparatus according to claim 7, wherein the determining, in response to determining that the feedback information does not comprise the acquired data, whether the feedback information comprises first fault information for indicating that the target data transmission end malfunctions, comprises:

outputting, in response to determining that the feedback information does not comprise the acquired data, preset alarm information, and determine whether the feedback information comprises the first fault information for indicating that the target data transmission end malfunctions.

11. The apparatus according to claim 7, wherein the operations further comprise, after the determining whether the feedback information comprises the acquired data:

determining, in response to determining that the feedback information comprises the acquired data, the target data transmission end as an actual data transmission end.

12. A non-transitory computer readable medium, storing a computer program thereon, the program, when executed by a processor, causes the processor to perform operations, the operations comprising:

sending a preset data acquisition request to a target data transmission end, wherein the target data transmission end is included in at least two preset data transmission ends, and the target data transmission end is communicatively connected with a target data acquisition end, and is configured for sending the preset data acquisition request to the target data acquisition end, and receiving acquired data for the preset data acquisition request sent by the target data acquisition end;

receiving feedback information for the preset data acquisition request from the target data transmission end, and determining whether the feedback information comprises the acquired data;

determining, in response to determining that the feedback information does not comprise the acquired data, whether the feedback information comprises first fault information for indicating that the target data transmission end malfunctions; and selecting, in response to determining that the feedback information comprises the first fault information, a data transmission end other than the target data transmission end from the at least two data transmission ends as a new target data transmission end, wherein the new target data transmission end is communicatively connected with the target data acquisition end and is configured for sending the preset data acquisition request to the target data acquisition end, and receiving the acquired data for the preset data acquisition request sent by the target data acquisition end.

* * * * *